(12) United States Patent
Fiorentino et al.

(10) Patent No.: US 11,597,531 B2
(45) Date of Patent: Mar. 7, 2023

(54) MAGNETIC REFUELING BOOM POSITIONING

(71) Applicant: The Boeing Company, Chicago, IL (US)

(72) Inventors: Hilary J. Fiorentino, Mukilteo, WA (US); Brett Dayton Sjostrom, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 16/832,874

(22) Filed: Mar. 27, 2020

(65) Prior Publication Data

US 2023/0043580 A1 Feb. 9, 2023

(51) Int. Cl.
*B64D 39/06* (2006.01)
*H01F 7/02* (2006.01)
(52) U.S. Cl.
CPC ........... *B64D 39/06* (2013.01); *H01F 7/0247* (2013.01)

(58) Field of Classification Search
CPC ....... B64D 39/06; H01F 7/0247; G01S 17/88; G06T 7/20
See application file for complete search history.

(56) References Cited

U.S. PATENT DOCUMENTS

| | | | | |
|---|---|---|---|---|
| 5,326,052 A | * | 7/1994 | Krispin | B64D 39/06 244/135 A |
| 6,966,525 B1 | * | 11/2005 | Schroeder | B64D 39/00 244/135 A |
| 9,840,336 B2 | * | 12/2017 | Barsheshet | B64D 39/04 |
| 2006/0145023 A1 | * | 7/2006 | Babb | B64G 1/64 244/172.4 |

* cited by examiner

*Primary Examiner* — Justin M Benedik
(74) *Attorney, Agent, or Firm* — Kwan & Olynick LLP (57) ABSTRACT

Described are systems and methods for magnetically assisted boom refueling. In certain examples, a magnetic refueling receiver is disclosed that includes a refueling receptacle configured to receive a portion of a refueling boom and a receptacle magnet disposed around at least a portion of a perimeter of the refueling receptacle. In another example, a magnetic refueling boom is disclosed that includes a refueling boom structure that includes a first end configured to be inserted into a refueling receiver and a pipe magnet disposed around at least a portion of a perimeter of the refueling boom structure.

20 Claims, 9 Drawing Sheets

MAGNETIC REFUELING BOOM POSITIONING

BACKGROUND

Certain aerial refueling aircraft utilize an aerial refueling boom to perform refueling. Typically, when a deployment of the refueling boom is commanded, the refueling boom is flown towards an aircraft to be refueled. The refueling boom must be lined up with a fueling receptacle of the aircraft to be refueled before the boom is inserted into the receptacle. Fuel is only delivered after the boom has been properly inserted into the receptacle.

SUMMARY

Described are methods and systems for magnetically assisted boom refueling. In certain examples, a magnetic refueling receiver is disclosed. The magnetic refueling receiver includes a refueling receptacle configured to receive a portion of a refueling boom and a receptacle magnet disposed around at least a portion of a perimeter of the refueling receptacle.

In another example, a magnetic refueling boom is disclosed. The magnetic refueling boom includes a refueling boom structure that includes a first end configured to be inserted into a refueling receiver and a pipe magnet disposed around at least a portion of a perimeter of the refueling boom structure.

Illustrative, non-exclusive examples of inventive features according to present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various examples.

DETAILED DESCRIPTION

In the following description, numerous specific details are set forth in order to provide a thorough understanding of the presented concepts. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Introduction

Described herein are control techniques for magnetically assisted boom refueling. In certain examples, a magnetic refueling receiver is disclosed. The magnetic refueling receiver includes a refueling receptacle configured to receive a portion of a refueling boom and a receptacle magnet disposed around at least a portion of a perimeter of the refueling receptacle. In another example, a magnetic refueling boom is disclosed. The magnetic refueling boom includes a refueling boom structure that includes a first end configured to be inserted into a refueling receiver and a pipe magnet disposed around at least a portion of a perimeter of the refueling boom structure.

Additionally, a technique of positioning a refueling boom relative to a refueling receiver is also disclosed. In certain examples, such a technique includes moving a refueling boom toward a refueling receiver, operating a pipe magnet of the refueling boom and/or a receptacle magnet of the refueling receiver to draw the refueling boom to the refueling receiver, and inserting a portion of the refueling boom into the refueling receiver. Additionally, the technique, in certain examples, also includes operating the pipe magnet or the receptacle magnet in a second polarity to disengage the refueling boom from the refueling receiver and disengaging the refueling boom from the refueling receiver.

In various examples, the systems and techniques described herein are incorporated into aerial refueling systems such as boom operated aerial refueling systems. In other examples, the systems and techniques are incorporated in other systems such as ground based refueling systems (e.g., between vehicles) and stationary refueling systems (e.g., such as refueling stations).

Figure 1A:
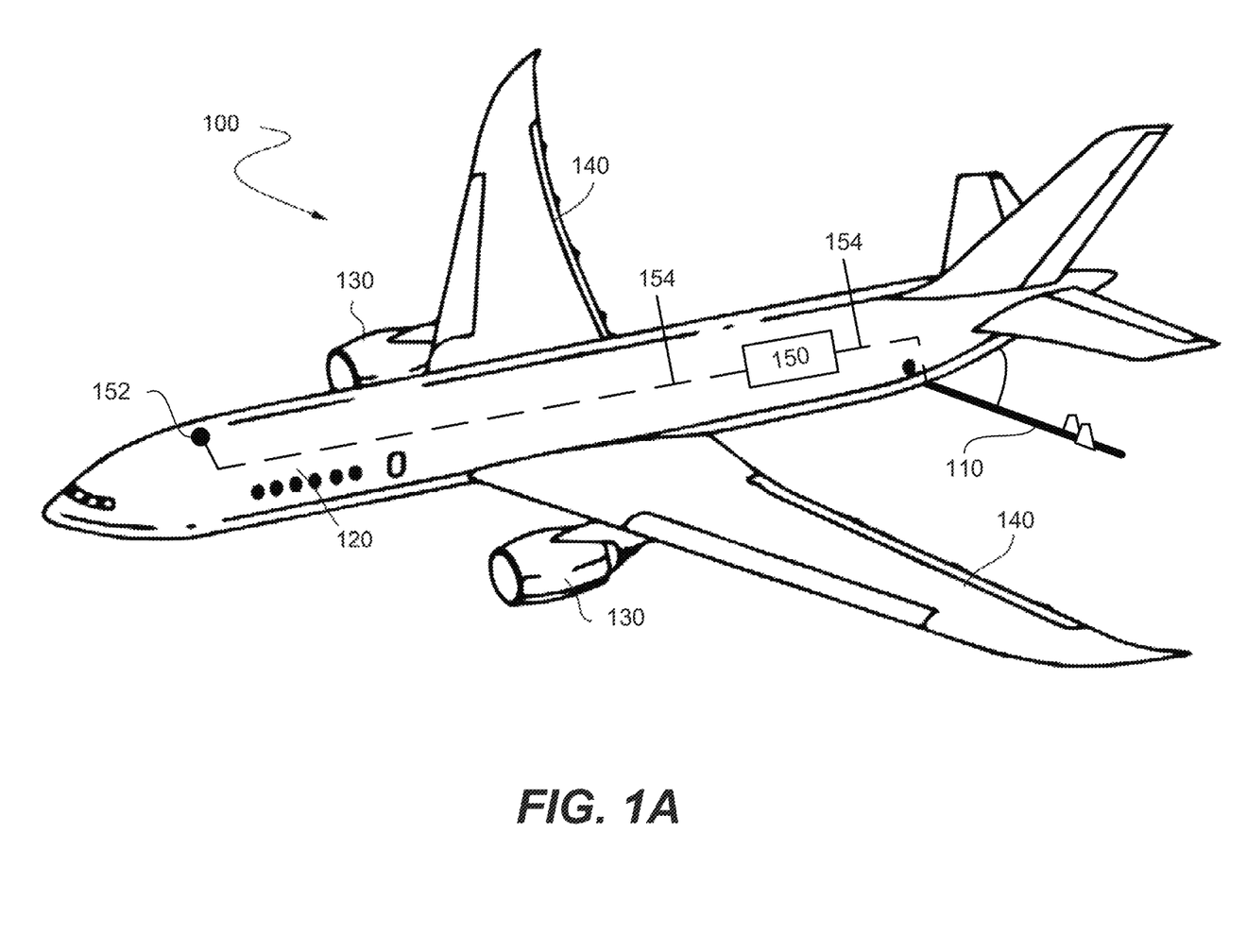
FIG. 1A illustrates a vehicle with a refueling boom, in accordance with some examples.

An example of a vehicle equipped with refueling boom is shown in FIG. 1A. FIG. 1A illustrates a vehicle with a refueling boom, in accordance with some examples. FIG. 1A illustrates vehicle 100 that is a fixed wing aircraft, but other examples include other structures (e.g., helicopters, variable wing aircraft, short takeoff and landing aircraft, spacecraft, drones, and other such vehicles).

Vehicle 100 includes fuselage 120, wings 140, and aircraft propulsors 130. Each of aircraft propulsors 130 are coupled to a respective wing 140. Wings 140 are coupled to fuselage 120. Vehicle 100 further includes refueling boom 110 coupled to a portion of fuselage 120 (e.g., a rearward portion of fuselage 120). Further details of refueling boom 110 are shown and described in FIG. 1B.

Refueling boom 110 is controlled by controller 150. Controller 150 includes, in various examples, a memory, a processor, and other logic device components. Controller 150 receives data, performs calculations, and provides outputs (e.g., control instructions) to various other portions of vehicle 100. Controller 150 is communicatively coupled to refueling boom 110 through communication network 154. In certain examples, communication network 154 is any type of wired and/or wireless network that communicates data and/or power to and from controller 150.

In various examples, vehicle 100 also includes refueling receiver 152. Refueling receiver 152 is configured to receive a refueling boom to allow vehicle 100 to be aerially refueled. Refueling receiver 152, in certain examples, includes a receptacle configured to receive a refueling boom.

In various examples, refueling boom 110 and/or refueling receiver 152 includes one or more magnets. The magnet(s) assist(s) in the positioning of refueling boom 110 relative to the refueling receiver of another vehicle by using magnetic force to position refueling boom 110 relative to the refueling receiver of the associated aircraft or by positioning the refueling boom of the associated aircraft relative to refueling receiver 152. In certain examples, the magnet(s) include electromagnet(s) that are configured to be switched on and off and/or reverse polarity. In certain such examples, operation of the electromagnet(s) is controlled by controller 150. The magnetic aerial refueling systems are further described herein.

Refueling Boom Example

Figure 1B:
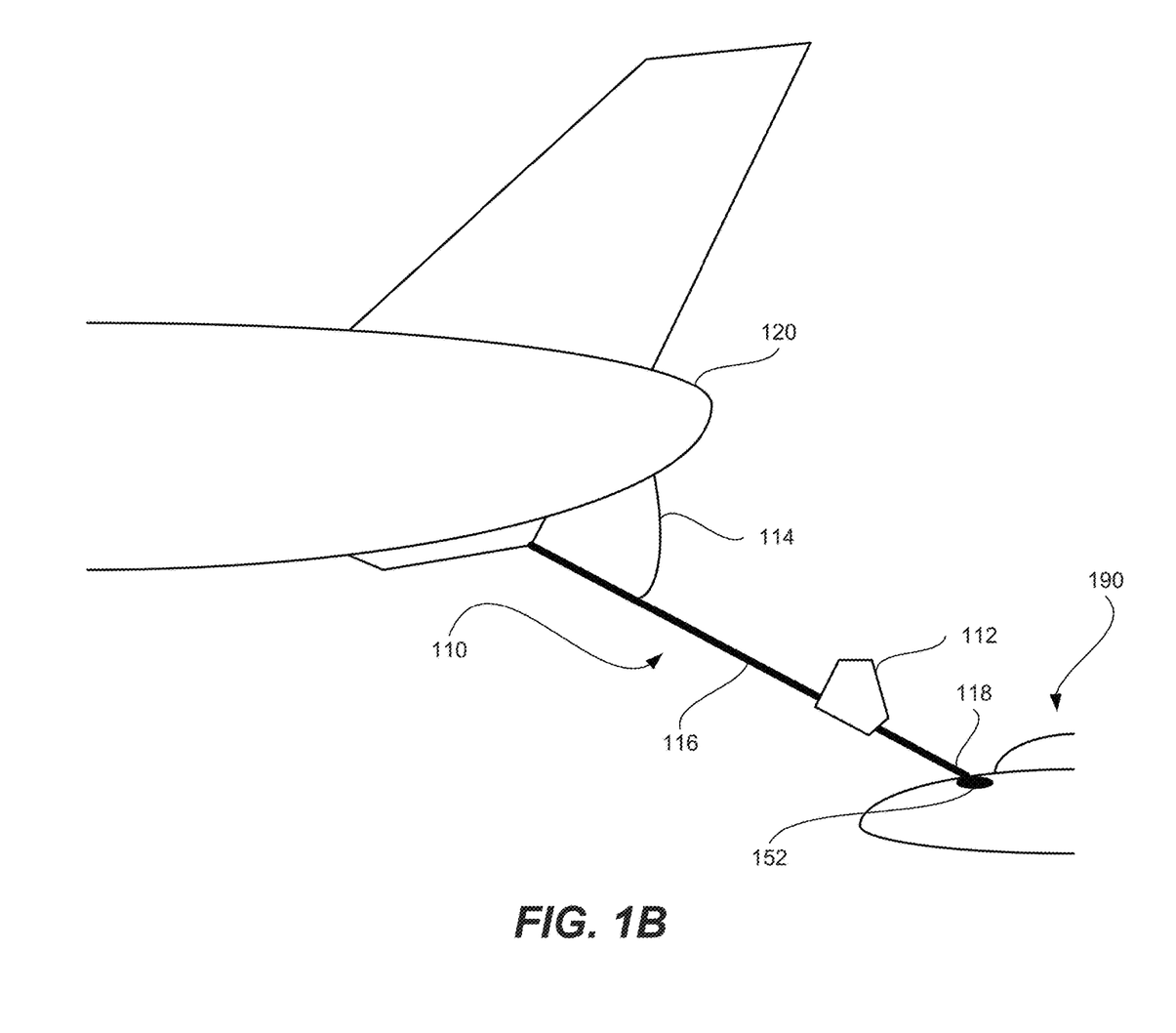
FIG. 1B illustrates a side view of aerial refueling between a plurality of vehicles, in accordance with some examples.

FIG. 1B illustrates a side view of aerial refueling between a plurality of vehicles, in accordance with some examples. FIG. 1B illustrates refueling boom 110 coupled to fuselage 120. In various examples, refueling boom 110 is coupled to fuselage 120 and, when in a stowed position, is latched to fuselage 120. Refueling boom 110 is, in certain examples, a "flying boom" configuration of an aerial refueling system.

Refueling boom 110 includes refueling boom structure 116, hoist 114 coupled to refueling boom structure 116, and boom aerodynamic control surface 112 coupled to refueling boom structure 116. Refueling boom structure 116 includes a first end 118. First end 118 is configured to be inserted into a refueling receptacle of an associated aircraft to deliver fuel to the associated aircraft, such as a refueling receptacle of refueling receiver 152 of associated vehicle 190. Associated vehicle 190, in certain examples, is any type of vehicle that is refueled by the systems and techniques described herein.

In certain examples, hoist 114 is configured to move refueling boom structure 116. Boom aerodynamic control surface 112 is coupled to a portion of refueling boom structure 116. Boom aerodynamic control surface 112 includes one or more wing structures and/or other aerodynamic features configured to generate lift when aircraft 100 is flying at speed. In certain examples, various portions of boom aerodynamic control surface 112 are configured to be manipulated (e.g., pivoted) to provide control over the flight characteristics of refueling boom structure 116.

Operation of boom aerodynamic control surface 112 and, thus, control of refueling boom 110, is controlled, partially or fully, by one or more aerodynamic actuators. In certain examples, boom aerodynamic control surface 112 includes both an elevator and a rudder. In such a configuration, the aerodynamic actuators include an elevator actuator to control the elevator and a rudder actuator to control the rudder.

Refueling boom 110 performs refueling operations by inserting first end 118 into the receptacle of refueling receiver 152 of associated vehicle 190. Once inserted, fuel is then delivered to associated vehicle 190 through refueling boom 110. In various examples described herein, refueling boom 110 and/or refueling receiver 152 includes one or more magnets that aid in the positioning of refueling boom 110 relative to refueling receiver 152.

Examples of Magnetic Refueling Systems

Figure 2:
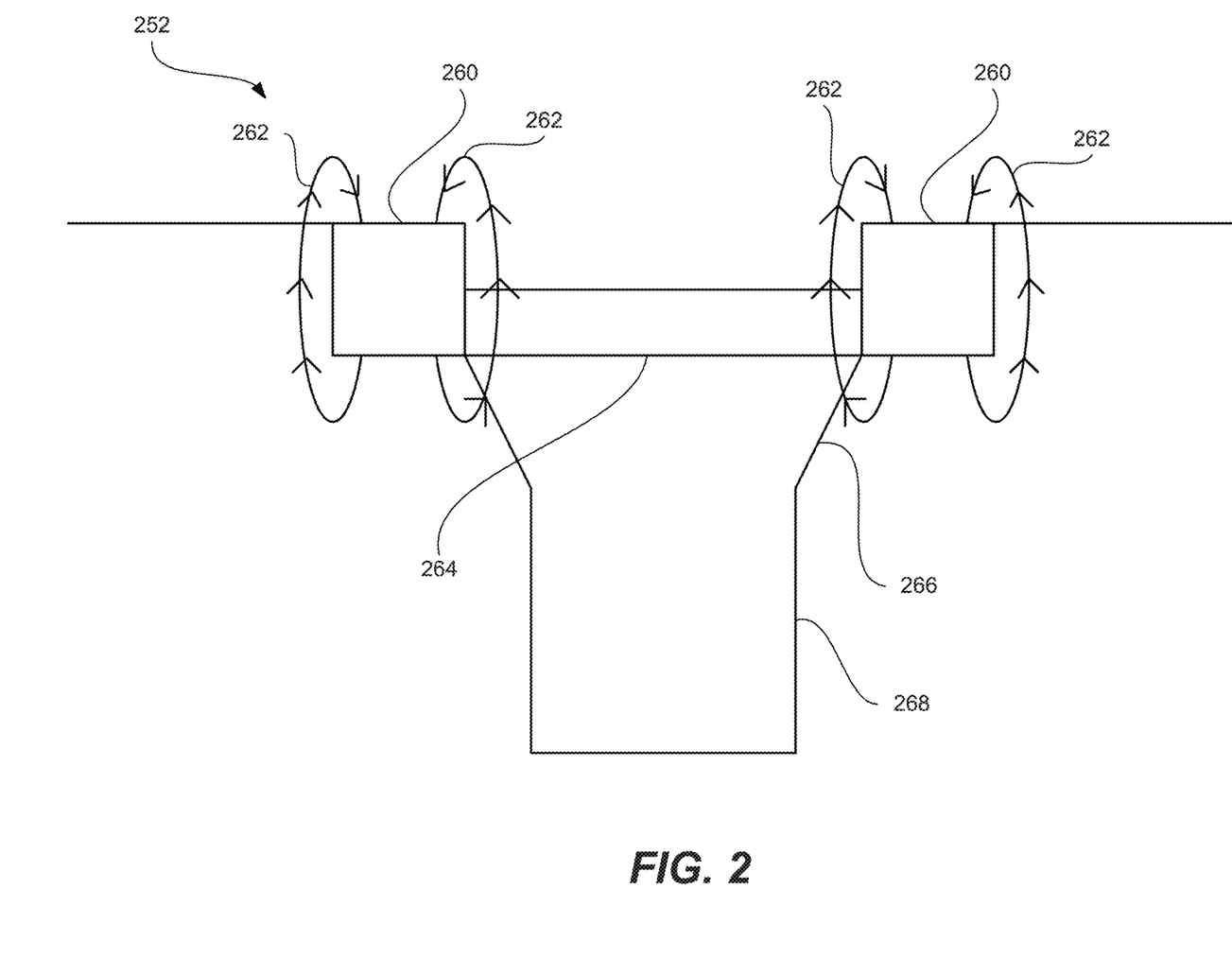
FIG. 2 illustrates a side cutaway view of a magnetic refueling receptacle, in accordance with some examples.

FIG. 2 illustrates a side cutaway view of a magnetic refueling receptacle, in accordance with some examples. FIG. 2 illustrates refueling receiver 252 configured to receive a refueling boom. Refueling receiver 252 includes refueling receptacle 268 and receptacle magnet 260.

Refueling receiver 252 includes refueling receptacle 268 and refueling cover 264. Refueling receptacle 268 is configured to receive a refueling boom structure of a refueling boom. Refueling receptacle 268, in certain examples, is fluidically connected to a fuel tank and configured to fluidically communicate fuel received to the fuel tank. Refueling receptacle 268 includes lead-in 266. Lead-in 266 is configured to allow for a refueling boom structure to be properly inserted into refueling receptacle 268 even if the refueling boom structure is not perfectly aligned with refueling receptacle 268.

Refueling cover 264 is configured to be disposed over refueling receptacle 268 to seal or partially seal refueling receptacle 268. Refueling cover 264, in certain examples, is configured to move between at least an open position and a closed position. In the open position, refueling cover 264 allows for a portion of a refueling boom to be inserted into refueling receptacle 268. In the closed position, refueling cover 264 prevents the refueling boom from being inserted into refueling receptacle 268.

Receptacle magnet 260 is, in certain examples, a standard magnet (e.g., a magnet that is always generating an electromagnetic field) or an electromagnet (e.g., a magnet that generates an electromagnetic field when a current is applied to the magnet). Receptacle magnet 260 is, in certain examples, disposed proximate to refueling receptacle 268. Receptacle magnet 206 is, in certain such examples, disposed below, for example, a skin of the fuselage of an aircraft or disposed on or flush with the skin of the fuselage. Thus, receptacle magnet 206 is positioned on the surface or below the surface of the body of a vehicle. Receptacle magnet 206 is positioned in a manner to allow for magnetic fields generated by receptacle magnet 206 to interact with other objects within a threshold distance to receptacle magnet 206.

In certain examples, receptacle magnet 260 is disposed around at least a portion of a perimeter of refueling receptacle 268. In other examples, receptacle magnet 260 is disposed within a portion of the vehicle in a manner that allows for receptacle magnet 260 to aid in the positioning of a refueling boom relative to refueling receptacle 268.

Receptacle magnet 260 is configured to generate magnetic field 262. As refueling booms are typically metallic and interact with magnetic fields, magnetic field 262 of receptacle magnet 260 provides an attractive force to a refueling boom within a threshold distance of receptacle magnet 260. The attractive force pulls the refueling boom towards certain regions proximate to receptacle magnet 260, aiding in the positioning of the refueling boom relative to refueling receptacle 268. Techniques for magnetically assisted positioning of a refueling boom relative to a refueling receptacle are further described herein.

In various examples, receptacle magnet 260 is a standard magnet (e.g., magnetic field 262 is constantly generated by receptacle magnet 260) or is an electromagnet configured to generate magnetic field 262 only when receptacle magnet 260 is powered.

In certain examples where receptacle magnet 260 is an electromagnet, the current of receptacle magnet 260 is configured to be reversed when the refueling boom is disengaging from refueling receiver 252, to aid in the disengagement.

Figure 3A:
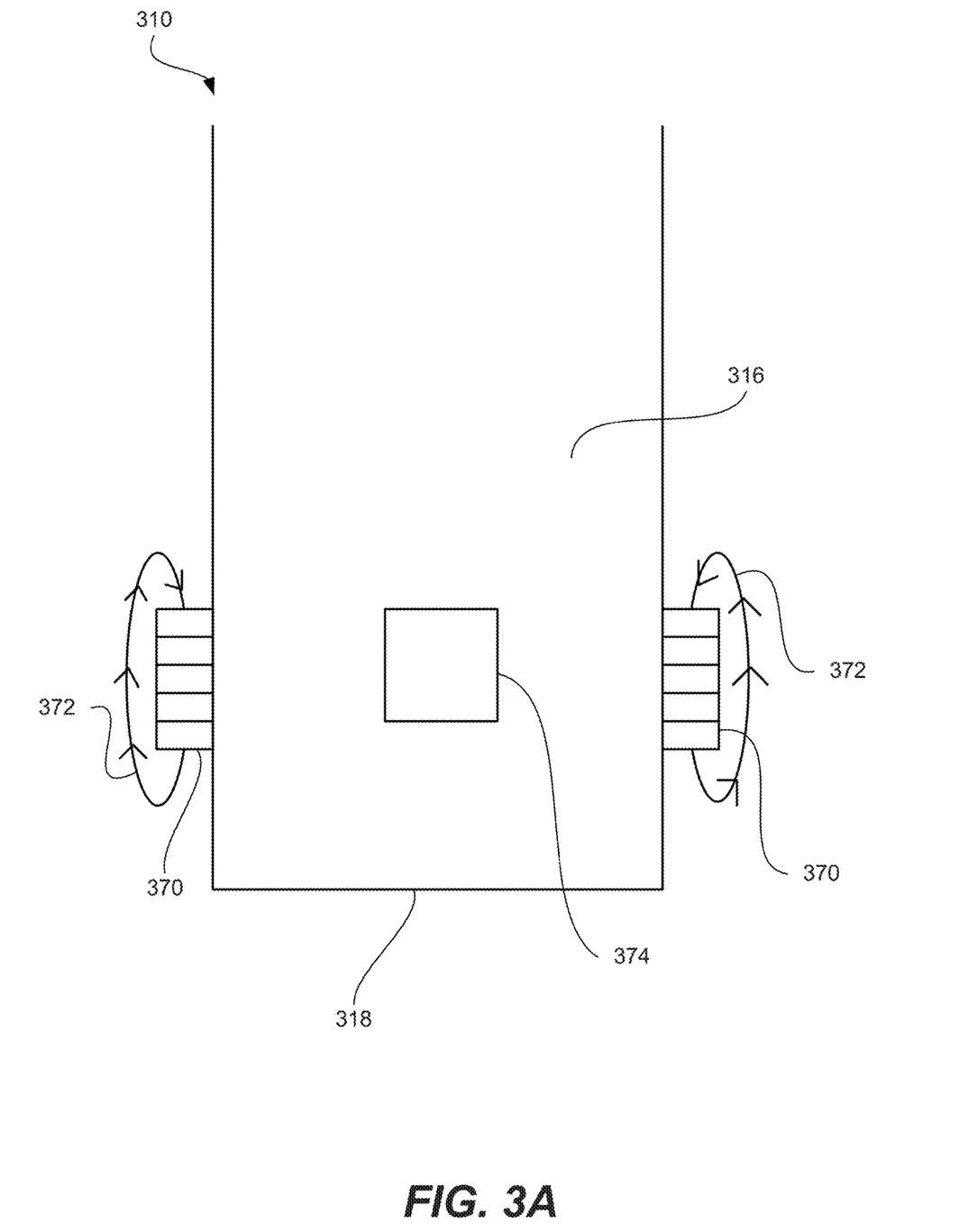
FIG. 3A illustrates a side view of a magnetic refueling boom structure of a refueling boom, in accordance with some examples.

FIG. 3A illustrates a side view of a magnetic refueling boom structure of a refueling boom, in accordance with some examples. FIG. 3A illustrates refueling boom 310. Refueling boom 310 includes refueling boom structure 316 with first end 318, positioning camera 374, and pipe magnet 370.

In various examples, refueling boom structure 316 is a cylinder or another shape with an opening into the middle of refueling boom structure 316. Refueling boom structure 316 is configured to transport fuel within refueling boom structure 316 to first end 318. First end 318 is configured to, when inserted into a refueling receptacle, provide fuel to the refueling receptacle.

Pipe magnet 370 is disposed proximate to first end 318. In certain examples, pipe magnet 370 is set back from first end 318. In other examples, pipe magnet 370 is disposed on or near first end 318. In certain examples, pipe magnet 370 is disposed around the perimeter, or a portion thereof, of refueling boom structure 316. In other examples, pipe magnet 370 is fully or partially embedded within a portion of refueling boom structure 316.

Pipe magnet 370 is configured to generate magnetic field 372 to generate a force to attract and position refueling boom structure 316 relative to a refueling receptacle. Magnetic field 372 interacts, in certain examples, with a magnetic field generated by a receptacle magnet and/or another metallic element disposed proximate to the refueling receptacle and configured to interact with a magnetic field. Thus, in certain examples, magnetic field 372, when disposed within a threshold distance to the refueling receptacle, attracts refueling boom structure 316 towards the refueling receptacle, aiding in the positioning of the refueling boom 310 relative to the refueling receptacle.

In various examples, pipe magnet 370 is a standard magnet (e.g., magnetic field 372 is constantly generated by pipe magnet 370) or is an electromagnet configured to generate magnetic field 372 only when pipe magnet 370 is powered. In certain examples where pipe magnet 370 is an electromagnet, the current of pipe magnet 370 is configured to be reversed when disengaging refueling boom 310 from the refueling receiver to provide a disengaging force to push away refueling boom 310 from the refueling receiver.

Positioning camera 374 is disposed on a portion of refueling boom structure 316. Positioning camera 374, in certain examples, is any type of visual or non-visual (e.g., thermal) camera. Data from positioning camera 374 (e.g., video data) is communicated via communication network 154 to controller 150. Controller 150 then uses the video data to automatically align refueling boom 310 and/or to aid a boom operator in aligning refueling boom 310 by providing a video feed. Thus, in certain examples, positioning camera 374 is configured to allow for an operator of refueling boom 310 to obtain a "gun sight" view of refueling boom structure 316 to aid in positioning of refueling boom 310.

Furthermore, in certain other examples, controller 150 detects when refueling boom 110 is being magnetically positioned and receives the video data to aid in the positioning of refueling boom 110. Thus, for example, when a magnetic pull is detected, controller 150 uses the video data to determine that a refueling receptacle is nearby, to confirm that the magnetic pull is from a refueling receptacle. Upon determining that the magnetic pull is from a refueling receptacle, controller 150, in certain examples, allows for refueling boom 110 to be operated in a manner more receptive to magnetic positioning (e.g., controller 110 determines magnetic interactions and allows for refueling boom 110 to move in the direction of magnetic attraction). Furthermore, controller 150, in certain examples, automatically moves toward the identified refueling receptacle if a magnetic attractive force in the same direction is also detected.

Figure 3B:
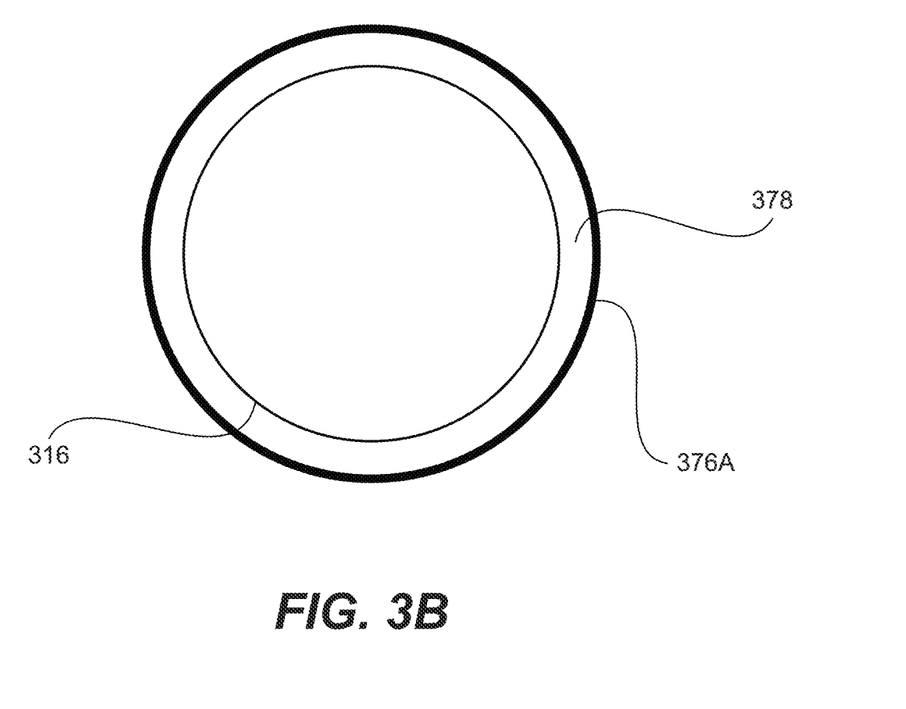
FIGS. 3B and 3C illustrate front views of a magnetic refueling boom structure of a refueling boom, in accordance with some examples.
Figure 3C:
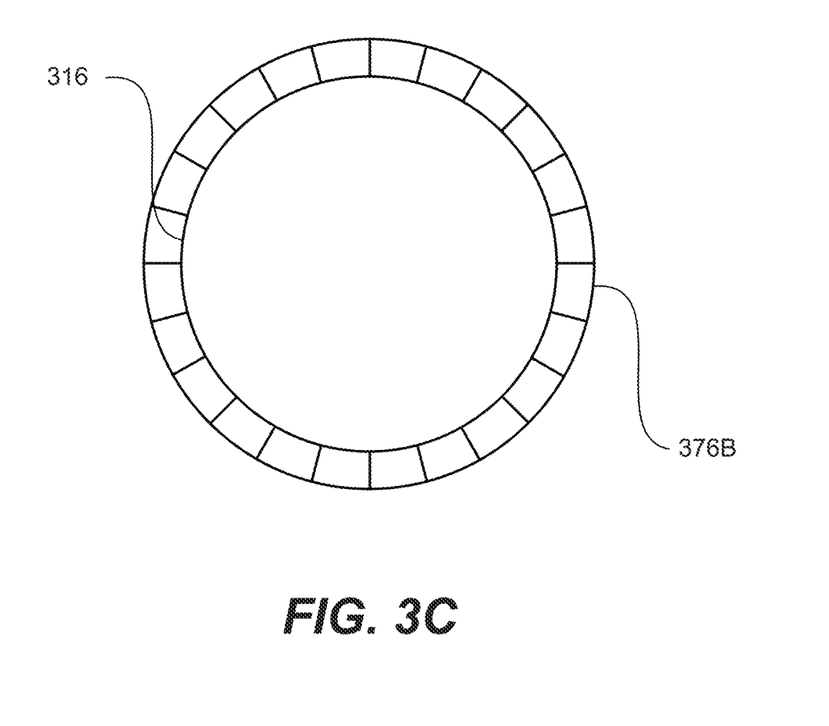

FIGS. 3B and 3C illustrate front views of a magnetic refueling boom structure of a refueling boom, in accordance with some examples. FIGS. 3B and 3C illustrate refueling boom structure 316 with various configurations of magnets. While FIGS. 3B and 3C describe magnets as integrated into refueling boom structures, it is appreciated that, in other examples, the same or similar configurations of magnets are used in the context of refueling receptacles. Thus, the layouts described are, in certain examples, used for one or both of refueling boom structures and refueling receptacles.

FIG. 3B illustrates refueling boom structure 316 with steel pipe 378 surrounded by magnetic coils 376A. Steel pipe 378 allows for refueling boom structure 316 to magnetically interact with other magnetic fields (e.g., those generated by a receptacle magnet). Magnetic coils 376A are magnets that generate their own magnetic field. In certain examples, magnetic coils 376A are powered electromagnets. That is, when subjected to a first current, magnetic coils 376A generate a first magnetic field (e.g., a magnetic field that provides an attractive force to metal). When subjected to a second current, magnetic coils 376A generate a second magnetic field (e.g., a magnetic field that provides a repulsive force to metal). Thus, the magnetic field generated by magnetic coils 376A is able to reverse direction. In various examples, power systems of the vehicle powers magnetic coils 376A.

FIG. 3C illustrates refueling boom structure 316 surrounded by bar magnets 376B arranged around the perimeter of refueling boom structure 316. In certain examples, bar magnets 376B are configured to generate a magnetic field without being powered by an outside current. Thus, bar magnets 376B provide a constant force attracting refueling boom structure 316 to any metal within the environment.

Figure 4:
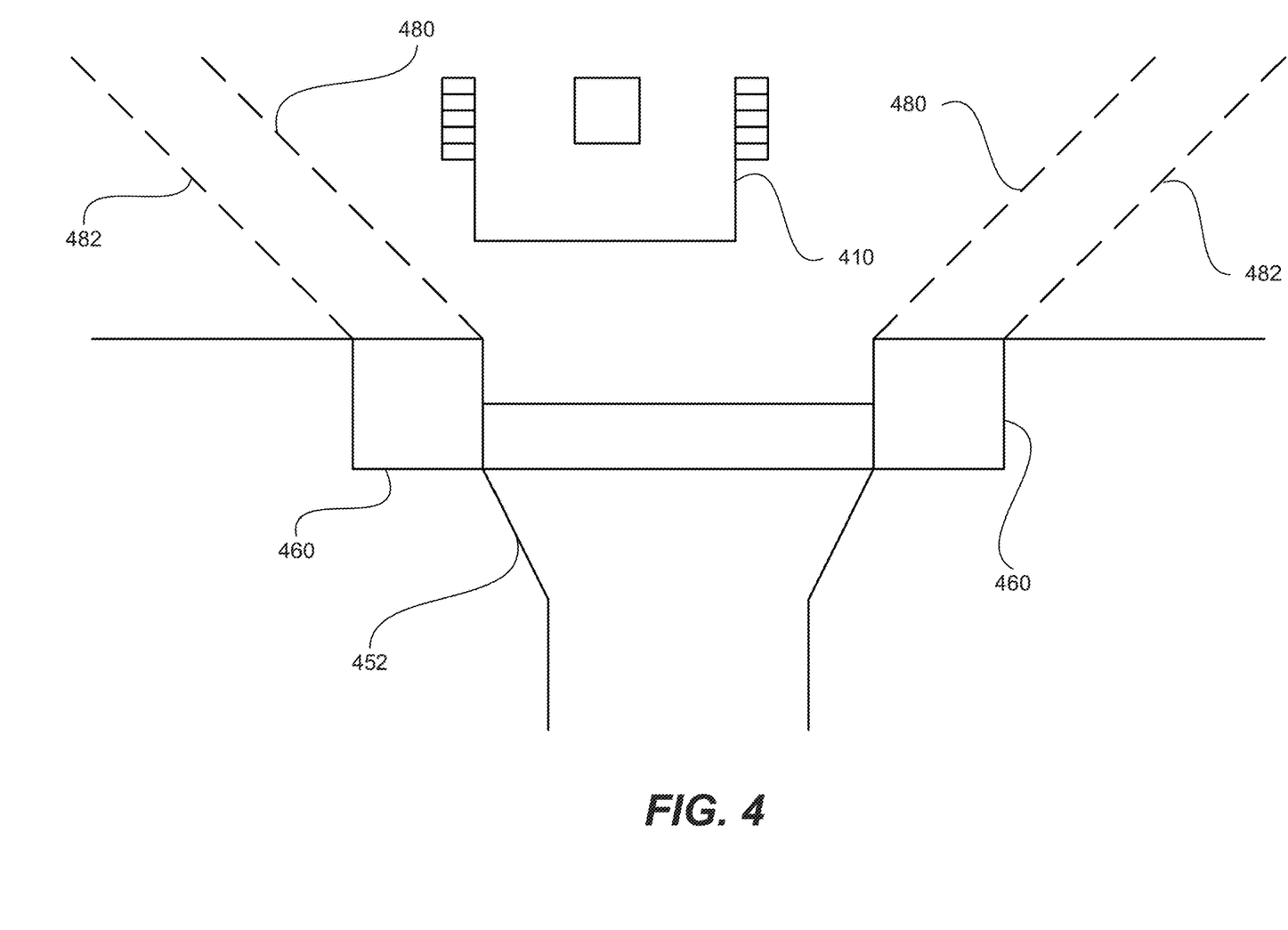
FIG. 4 illustrates a side cutaway view of a magnetically equipped refueling boom system, in accordance with some examples.

FIG. 4 illustrates a side cutaway view of a magnetically equipped refueling boom system, in accordance with some examples. FIG. 4 illustrates a magnetically equipped refueling boom system that includes refueling boom 410 and refueling receiver 452. As shown in FIG. 4, refueling receiver 452 includes receptacle magnet 460.

Receptacle magnet 460 generates magnetic fields defined by capture envelopes 480 and 482. In various examples, capture envelope 480 is a stronger capture envelope than capture envelope 482. Though capture envelope 482 provides some attractive force to position refueling boom 410, capture envelope 482 is, in certain examples, weaker than capture envelope 480. One or both of capture envelopes 480 and 482 extends from magnet 460 in a conical shape.

Capture envelopes 480 and 482 provide attractive forces to position refueling boom 410. In various examples, if refueling boom 410 is moved into capture envelopes 480 and 482, refueling boom 410 is magnetically drawn towards refueling receiver 452 by the magnetic field generated by receptacle magnet 460 (as defined by capture envelopes 480 and 482). The magnetic force aids in the positioning of refueling boom 410 from both an orientation and a distance perspective. That is, the magnetic force aids in properly positioning refueling boom 410 relative to refueling receiver 452 such that refueling boom 410 is able to be properly inserted into refueling receiver 452.

Furthermore, the magnetic force draws refueling boom 410 towards refueling receiver 452.

In various examples, capture envelopes 480 and 482 are not homogenous. That is, the magnetic force from capture envelopes 480 and 482 decrease as a function of distance from receptacle magnet 460. Thus, the farther refueling boom 410 is from receptacle magnet 460, the lower the level of magnetic force experience by refueling boom 410.

Past a certain distance, the magnetic force experienced by refueling boom 410 from receptacle magnet 460 is trivial.

In various examples, refueling boom 410 includes or does not include magnets of its own (e.g., pipe magnet 370). In examples where refueling boom 410 includes magnets, the magnets of refueling boom 410 are used to further attract refueling boom 410 to refueling receiver 452 and/or to properly position refueling boom 410 relative to refueling receiver 452. In certain examples, the magnet of refueling boom 410 is configured to reverse polarity such that the magnet is in a first polarity to attract refueling boom 410 to refueling receiver 452 when in the process of engaging refueling receiver 452 with refueling boom 410 and in a second polarity to disengage refueling boom 410 away from refueling receiver 452.

Figure 5A:
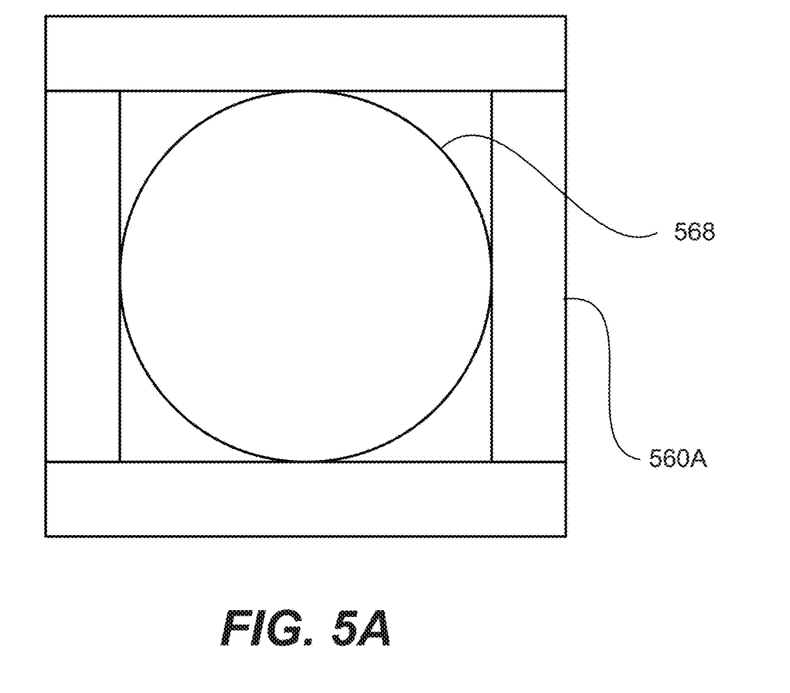
FIGS. 5A and 5B illustrate front cutaway views of various example magnet configurations, in accordance with some examples.
Figure 5B:
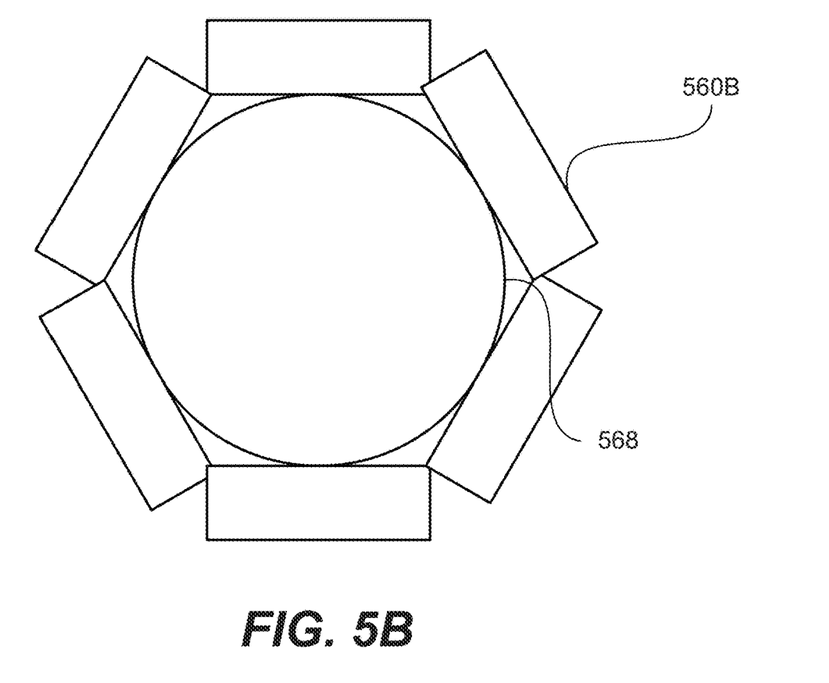

FIGS. 5A and 5B illustrate front cutaway views of various example magnet configurations, in accordance with some examples. FIGS. 5A and 5B illustrate configurations of magnets 560A and 560B, respectively, disposed around refueling receptacle 568. Magnets 560A are magnets (e.g., bar magnets) arranged in a square pattern around refueling receptacle 568 while magnets 560B are magnets arranged in a hexagonal pattern around refueling receptacle 568. The configurations illustrated in FIGS. 5A and 5B are illustrative; other examples arrange the magnets in other configurations.

Vehicle Examples

While the systems, apparatus, and methods disclosed above have been described with reference to airplanes and the aerospace industry, it will be appreciated that the examples disclosed herein is applicable to other contexts as well, such as automotive, railroad, and other mechanical and vehicular contexts. Accordingly, examples of the disclosure is described in the context of an airplane manufacturing and service method 600 as shown in FIG. 6A and vehicle 100 as shown in FIG. 6B in applicable to such other contexts.

Figure 6A:
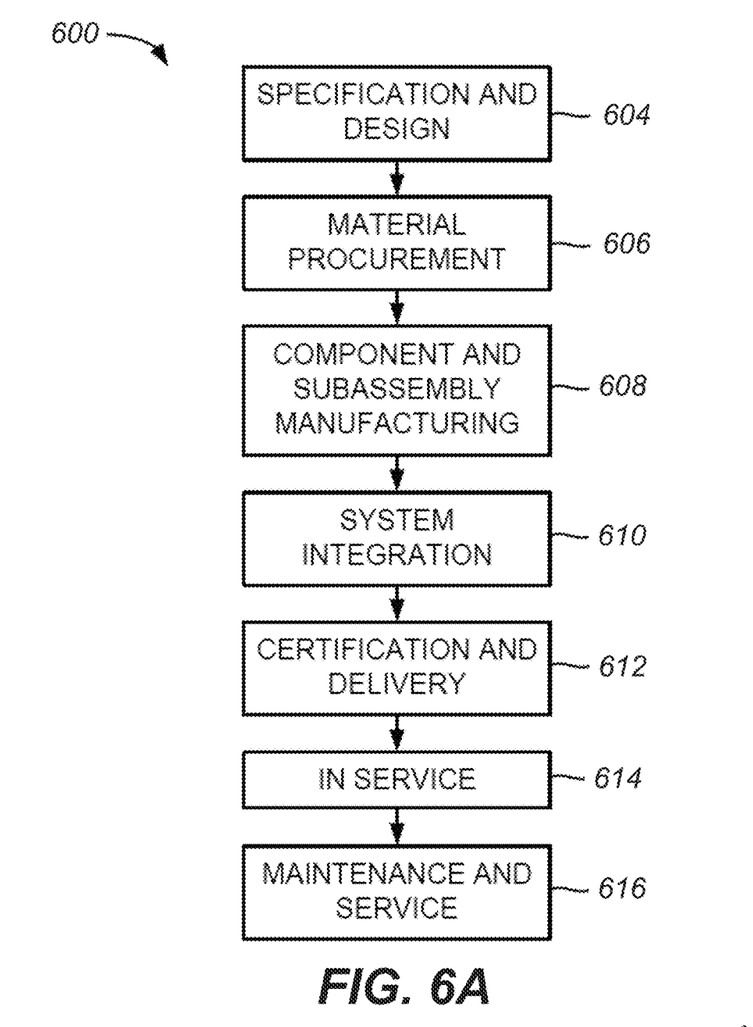
FIG. 6A illustrates a flow chart of an example of an aircraft production and service methodology, in accordance with some examples.

FIG. 6A illustrates a flow chart of an example of a vehicle production and service methodology, in accordance with some examples. In some examples, during pre-production, method 600 includes the specification and design 604 of vehicle 100 (e.g., an aircraft as shown in FIG. 1) and material procurement 606. During production, component and subassembly manufacturing 608 and system integration 610 of vehicle 100 takes place. Thereafter, vehicle 100 goes through certification and delivery 612 in order to be placed in service 614. While in service by a customer, the vehicle 100 is scheduled for routine maintenance and service 616 (e.g., modification, reconfiguration, refurbishment, and so on).

In certain examples, each of the processes of method 600 is performed or carried out by a system integrator, a third party, and/or an operator (e.g., a customer). For the purposes of this description, a system integrator includes any number of airplane manufacturers and major-system subcontractors; a third party includes any number of venders, subcontractors, and suppliers; and an operator includes, in certain examples, an airline, leasing company, military entity, service organization, and so on.

Figure 6B:
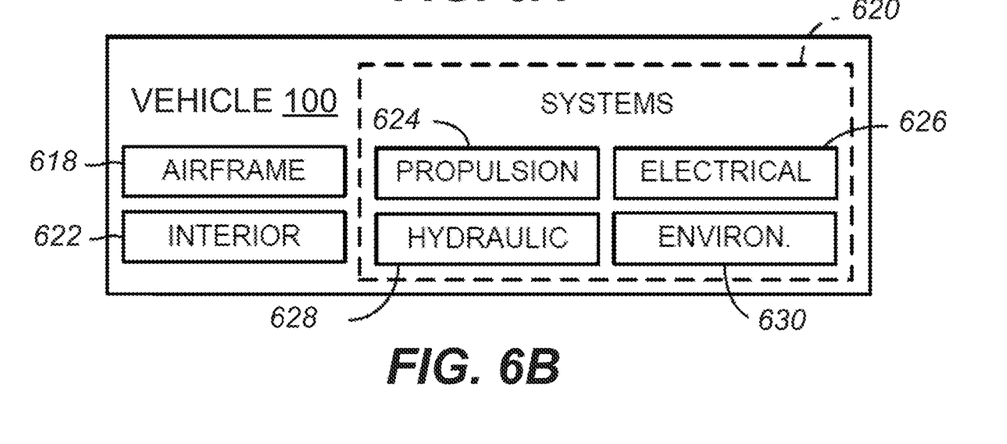
FIG. 6B illustrates a block diagram of an example of a vehicle, in accordance with some examples.

FIG. 6B illustrates a block diagram of an example of a vehicle, in accordance with some examples. As shown in FIG. 6B, the vehicle 100 (e.g., an aircraft) produced by method 600 includes airframe 618 with plurality of systems 620, and interior 622. Examples of systems 620 include one or more of propulsion system 624, electrical system 626, hydraulic system 628, and environmental system 630. In various examples, other systems are also included within vehicle 100. Although an aerospace example is shown, the described principles are applicable to other industries, such as the automotive industry.

Techniques of Operating a Magnetically Equipped Refueling Boom System

Figure 7:
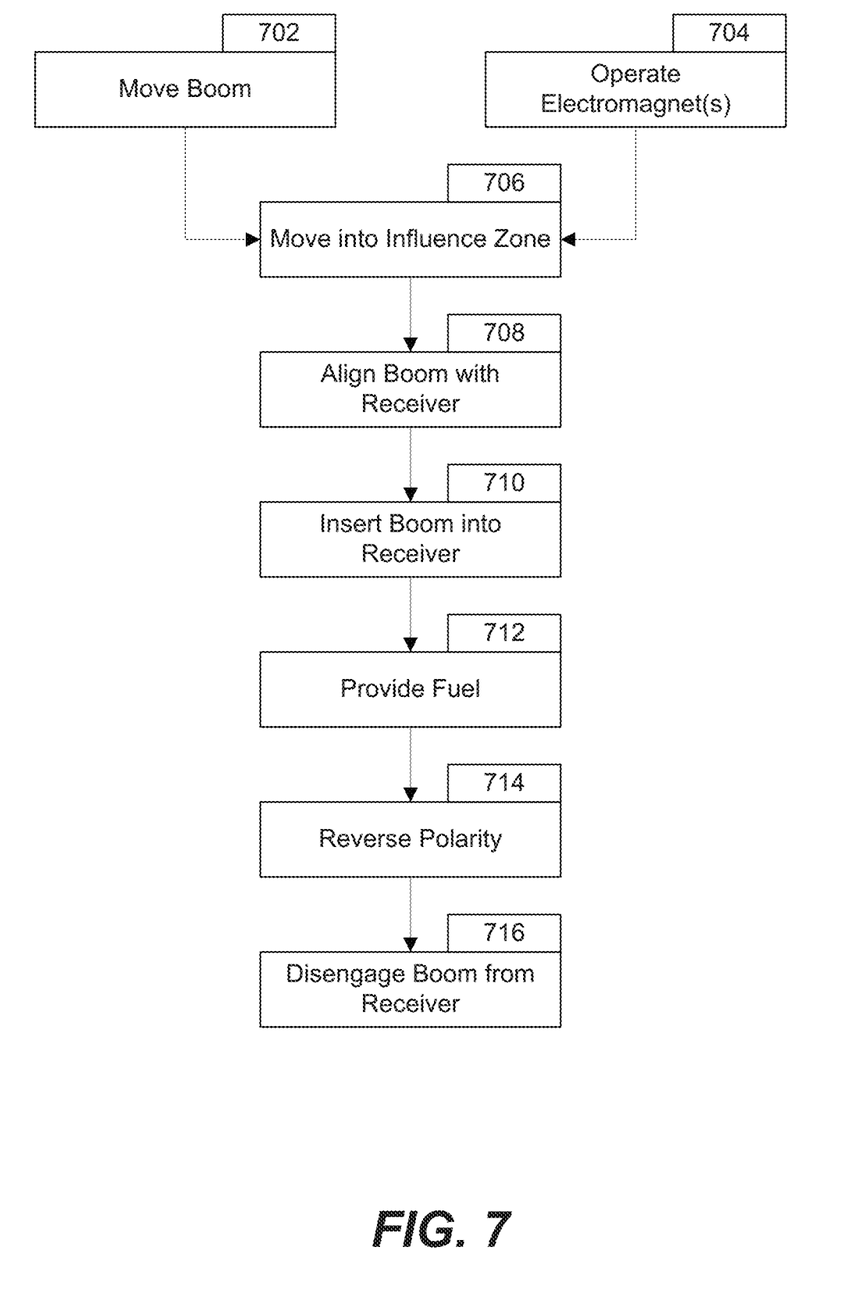
FIG. 7 is a flowchart illustrating a technique for operating a magnetically equipped refueling boom system, in accordance with some examples.

FIG. 7 is a flowchart illustrating a technique for operating a magnetically equipped refueling boom system, in accordance with some examples. In block 702, a refueling boom is moved towards a refueling receiver. In optional block 704, for examples where the receptacle magnet and/or the pipe magnet is one or more electromagnets, the electromagnets disposed within the refueling receiver and/or the refueling boom are operated in a first polarity to align and attract the refueling boom towards the refueling receiver.

The refueling boom then moves into the influence zone in block 706. Once in the influence zone, in block 708, magnetic forces position the refueling boom to be properly aligned with the refueling receiver. After the refueling boom is properly positioned relative to the refueling receiver, the refueling boom is inserted into the refueling receiver in block 710. In various examples, the receptacle magnet further attracts the refueling boom towards the refueling receiver. Furthermore, the refueling boom, in certain examples, also moves towards the refueling receiver under their own motive power. The refueling boom is then inserted into the refueling receiver. Once the refueling boom is properly inserted into the refueling receiver, fuel is provided by the refueling boom in block 712. Refueling operations are thus performed.

After refueling operations are performed, in examples with electromagnets, the polarity of one of the receptacle magnet and/or the pipe magnet is reversed in optional block 714. The refueling boom is then disengaged from the refueling receiver in block 716. In examples where optional block 714 is performed, repulsive force from the electromagnet due to the reversed polarity aids in disengaging the refueling boom from the refueling receiver. In other examples, the refueling boom is disengaged from the refueling receiver despite the attractive force generated by the magnet(s). Regardless, the refueling boom is disengaged from the refueling receiver.

FURTHER EXAMPLES

Further, the disclosure includes examples according to the following clauses:

Clause 1. An aircraft, comprising:
a refueling receiver comprising:
a refueling receptacle configured to receive a portion of a refueling boom; and
a receptacle magnet disposed around at least a portion of a perimeter of the refueling receptacle.

Clause 2. The aircraft of clause 1, further comprising a controller configured to cause the refueling receiver to perform operations comprising:
operating the receptacle magnet in a first polarity to draw the refueling boom to the refueling receiver; and
operating the receptacle magnet in a second polarity to disengage the refueling boom from the refueling receiver.

Clause 3. The aircraft of clause 2, wherein the operations further comprise:
determining that the refueling boom has finished providing fuel to the refueling receiver, wherein the operating the receptacle magnet in the second polarity is based on the determining.

Clause 4. The aircraft of clause 1, further comprising:
a fuselage, wherein the refueling receiver is disposed on the fuselage, and wherein at least a portion of the receptacle magnet is disposed on or directly below a skin of the fuselage.

Clause 5. The aircraft of clause 1, wherein the refueling receiver further comprises:
a refueling cover disposed over the refueling receptacle.

Clause 6. The aircraft of clause 1, wherein the receptacle magnet is configured to create a capture envelope extending in a conical shape from the receptacle magnet.

Clause 7. The aircraft of clause 1, wherein refueling receptacle comprises a receptacle lead-in.

Clause 8. The aircraft of clause 1, wherein the receptacle magnet comprises electromagnets, coils, and/or bar magnets.

Clause 9. An aircraft, comprising:
a refueling boom comprising:
a refueling boom structure comprising a first end configured to be inserted into a refueling receiver; and
a pipe magnet disposed around at least a portion of a perimeter of the refueling boom structure.

Clause 10. The aircraft of clause 9, further comprising a controller configured to cause the refueling boom to perform operations comprising:
operating the pipe magnet in a first polarity to draw the refueling boom to the refueling receiver; and
operating the pipe magnet in a second polarity to disengage the refueling boom from the refueling receiver.

Clause 11. The aircraft of clause 10, wherein the operations further comprise:
moving the refueling boom to engage the refueling receiver; and
determining that the refueling boom has finished providing fuel to the refueling receiver, wherein the operating the pipe magnet in the second polarity is based on the determining.

Clause 12. The aircraft of clause 9, further comprising:
a fuselage, wherein the refueling boom protrudes from the fuselage.

Clause 13. The aircraft of clause 9, wherein the pipe magnet is disposed proximate to the first end.

Clause 14. The aircraft of clause 9, further comprising:
a positioning camera disposed proximate to the first end.

Clause 15. The aircraft of clause 9, wherein the pipe magnet comprises electromagnets, coils, and/or bar magnets.

Clause 16. A method comprising:
moving a refueling boom toward a refueling receiver;
operating a pipe magnet of the refueling boom and/or a receptacle magnet of the refueling receiver in a first polarity to draw the refueling boom to the refueling receiver; and
inserting a portion of the refueling boom into the refueling receiver.

Clause 17. The method of clause 16, further comprising:
operating the pipe magnet or the receptacle magnet in a second polarity to disengage the refueling boom from the refueling receiver.

Clause 18. The method of clause 17, further comprising:
disengaging the refueling boom from the refueling receiver.

Clause 19. The method of clause 16, further comprising:
moving the refueling boom into a capture envelope of the receptacle magnet.

Clause 20. The method of clause 16, further comprising:
providing fuel from the refueling boom to the refueling receiver.

CONCLUSION

Although foregoing concepts have been described in some detail for purposes of clarity of understanding, it will be apparent that certain changes and modifications may be practiced within scope of appended claims. It should be noted that there are many alternative ways of implementing processes, systems, and apparatuses. Accordingly, present examples are to be considered as illustrative and not restrictive.

The invention claimed is:

1. An aircraft, comprising:
a refueling receiver, comprising:
a refueling receptacle, configured to receive a portion of a refueling boom; and
a receptacle magnet, disposed around at least an inner side wall portion of an entire perimeter of the refueling receptacle for engaging with a pipe magnet on an outside surface of the refueling boom.

2. The aircraft of claim 1, further comprising a controller, configured to cause the refueling receiver to:
operate the receptacle magnet in a first polarity to draw the refueling boom to the refueling receiver; and
operate the receptacle magnet in a second polarity to disengage the refueling boom from the refueling receiver.

3. The aircraft of claim 2, wherein the controller is further configured to:
determine that the refueling boom has finished providing fuel to the refueling receiver, wherein the operating the receptacle magnet in the second polarity is based on the determining.

4. The aircraft of claim 1, further comprising:
a fuselage, wherein the refueling receiver is disposed on the fuselage, and wherein at least a portion of the receptacle magnet is disposed on or directly below a skin of the fuselage.

5. The aircraft of claim 1, wherein the refueling receiver further comprises:
a refueling cover, disposed over the refueling receptacle.

6. The aircraft of claim 1, wherein the receptacle magnet is configured to create a capture envelope extending in a conical shape from the receptacle magnet.

7. The aircraft of claim 1, wherein refueling receptacle comprises a receptacle lead-in.

8. The aircraft of claim 1, wherein the receptacle magnet comprises at least one of electromagnets, coils, or bar magnets.

9. An aircraft, comprising:
a refueling boom, comprising:
a refueling boom structure, comprising a first end, configured to be inserted into a refueling receiver; and
a pipe magnet, disposed on an outside surface and around at least a portion of a perimeter of the refueling boom structure.

10. The aircraft of claim 9, further comprising a controller, configured to cause the refueling boom to:
operate the pipe magnet in a first polarity to draw the refueling boom to the refueling receiver; and
operate the pipe magnet in a second polarity to disengage the refueling boom from the refueling receiver.

11. The aircraft of claim 10, wherein the controller is further configured to cause the refueling boom to:
move the refueling boom to engage the refueling receiver; and
determine that the refueling boom has finished providing fuel to the refueling receiver, wherein the pipe magnet in the second polarity is operated based on the determining.

12. The aircraft of claim 9, further comprising:

a fuselage, wherein the refueling boom protrudes from the fuselage.

13. The aircraft of claim 9, wherein the pipe magnet is disposed proximate to the first end.

14. The aircraft of claim 9, further comprising:

a positioning camera, disposed proximate to the first end.

15. The aircraft of claim 9, wherein the pipe magnet comprises at least one of electromagnets, coils, or bar magnets.

16. A method comprising:

moving a refueling boom, which includes a pipe magnet disposed on an outside surface and around at least a portion of a perimeter of the refueling boom, toward a refueling receiver, which includes a receptacle magnet disposed around at least an inner side wall portion of a perimeter of the refueling receiver;

operating the pipe magnet of the refueling boom, and/or the receptacle magnet of the refueling receiver, in a first polarity to draw the refueling boom to the refueling receiver; and inserting a portion of the refueling boom into the refueling receiver.

17. The method of claim 16, further comprising:

operating the pipe magnet or the receptacle magnet in a second polarity to disengage the refueling boom from the refueling receiver.

18. The method of claim 17, further comprising:

disengaging the refueling boom from the refueling receiver.

19. The method of claim 16, further comprising:

moving the refueling boom into a capture envelope of the receptacle magnet.

20. The method of claim 16, further comprising:

providing fuel from the refueling boom to the refueling receiver.

\* \* \* \* \*